(12) United States Patent
Lipkin et al.

(10) Patent No.: US 11,168,581 B2
(45) Date of Patent: Nov. 9, 2021

(54) SERVICE APPARATUS FOR USE WITH ROTARY MACHINES

(71) Applicant: General Electric Company, Schenectady, NY (US)

(72) Inventors: Don Mark Lipkin, Niskayuna, NY (US); Todd William Danko, Niskayuna, NY (US); Mark John Zajkowski, Niskayuna, NY (US); Scott Michael Oppenheimer, Niskayuna, NY (US); Kori Unhee Macdonald, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 51 days.

(21) Appl. No.: 16/617,745

(22) PCT Filed: May 30, 2017

(86) PCT No.: PCT/US2017/035028
§ 371 (c)(1),
(2) Date: Nov. 27, 2019

(87) PCT Pub. No.: WO2018/222174
PCT Pub. Date: Dec. 6, 2018

(65) Prior Publication Data
US 2020/0102850 A1    Apr. 2, 2020

(51) Int. Cl.
*F01D 5/06*        (2006.01)
*F01D 21/00*       (2006.01)
(Continued)

(52) U.S. Cl.
CPC ............ *F01D 21/003* (2013.01); *B05C 11/00* (2013.01); *B05C 11/02* (2013.01); *B23P 6/005* (2013.01);
(Continued)

(58) Field of Classification Search
CPC .... F01D 5/005; F01D 21/003; F05D 2230/72; F05D 2260/83
See application file for complete search history.

(56) References Cited

U.S. PATENT DOCUMENTS 4,298,308 A * 11/1981 Richter .................. B25J 9/0081
                                                  318/488
4,991,441 A    2/1991 Nottingham et al.
(Continued)

FOREIGN PATENT DOCUMENTS

DE    199 24 607 A1    11/2000
EP     0 426 527 A1     5/1991
(Continued)

OTHER PUBLICATIONS

International Search Report of the International Searching Authority for PCT/US2017/035028 dated Feb. 5, 2018.
(Continued)

*Primary Examiner* — Ninh H. Nguyen
(74) *Attorney, Agent, or Firm* — Eversheds Sutherland (US) LLP

(57) ABSTRACT

A service apparatus for use in maintaining a turbine assembly (100) includes a carriage (132, 304) configured to move through a cavity of the turbine assembly (100), a motorized system (218, 500, 600, 700, 800) coupled to the carriage (132, 304), and a maintenance device (128, 400) coupled to the motorized system (218, 500, 600, 700, 800). The motorized system (218, 500, 600, 700, 800) is configured to move the maintenance device (128, 400) relative to the carriage (132, 304). The motorized system (218, 500, 600, 700, 800) includes a first motor (710, 720, 805) configured to move the maintenance device (128, 400) in a first direction (324) and a second motor (710, 720, 805) configured to move the maintenance device (128, 400) in a second direction (324).

12 Claims, 8 Drawing Sheets

(51) Int. Cl.
   *B23P 6/00* (2006.01)
   *B05C 11/02* (2006.01)
   *B05C 11/00* (2006.01)
   *F01D 5/00* (2006.01)

(52) U.S. Cl.
   CPC .......... *F01D 5/005* (2013.01); *F05D 2220/30* (2013.01); *F05D 2230/72* (2013.01)

(56) References Cited

U.S. PATENT DOCUMENTS

| | | | |
|---|---|---|---|
| 5,102,221 A | | 4/1992 | Desgranges et al. |
| 5,132,887 A | * | 7/1992 | Torii ................ B23K 26/0884 219/121.78 |
| 5,604,532 A | | 2/1997 | Tillmanns |
| 6,532,840 B2 | | 3/2003 | Hatley et al. |
| 7,032,279 B2 | * | 4/2006 | McCarvill ............... B23P 6/002 29/402.19 |
| 8,714,038 B2 | | 5/2014 | Moran et al. |
| 8,726,502 B2 | * | 5/2014 | Clark ................... F01D 25/285 29/889.1 |
| 9,145,791 B2 | * | 9/2015 | Yoon .................... F01D 21/003 |
| 9,657,597 B2 | * | 5/2017 | Moore ................. F01D 21/003 |
| 2002/0073788 A1 | | 6/2002 | Hatley et al. |
| 2005/0073673 A1 | | 4/2005 | Devitt et al. |
| 2005/0126291 A1 | | 6/2005 | Czerw et al. |
| 2008/0199304 A1 | | 8/2008 | Moran et al. |

FOREIGN PATENT DOCUMENTS

| | | |
|---|---|---|
| EP | 1 216 797 A1 | 6/2002 |
| GB | 2 425 764 | 11/2006 |
| JP | H03-49870 A | 3/1991 |
| JP | H03-98801 U | 10/1991 |
| JP | H11 270350 A | 10/1999 |
| JP | 2004 138068 A | 5/2004 |

OTHER PUBLICATIONS

Office Action, JP 2019-565345, dated Aug. 30, 2021 (with English Translation) (12 pp.).

* cited by examiner

SERVICE APPARATUS FOR USE WITH ROTARY MACHINES

BACKGROUND

The field of the disclosure relates generally to service apparatus and, more particularly, to service apparatus for inspecting and/or repairing rotary machines.

At least some known rotary machines, such as turbines for aircraft engines and gas and steam powered turbines for industrial applications, include an outer case and at least one rotor that carries multiple stages of rotating airfoils, i.e., blades, which rotate with respect to the outer case. In addition, the outer case carries multiple stages of stationary airfoils, i.e., guide vanes. The blades and guide vanes are arranged in alternating stages. In at least some known rotary machines, shrouds are disposed on the radially inner surfaces of a stator to form a ring seal around tips of the blades. Together, the blades, guide vanes, and shrouds define a primary flowpath inside the compressor and turbine sections of the rotary machine. This flowpath, combined with a flowpath through the combustor, defines a primary cavity within the rotary machine.

During operation, the components of the rotary machine experience degradation. Accordingly, for at least some known rotary machines, periodic inspections, such as borescope inspections, are performed to assess the condition of the rotary machine in-between service intervals. Examples of conditions observed during inspections include wear (e.g., from incursion of blade tips into the shrouds, particle-induced erosion, water droplet induced erosion, wear due to sliding contact between stationary components), impact (e.g., spallation of thermal barrier coating (TBC) or environmental barrier coating (EBC) from turbine-section components, leading edge burring/bending of compressor blades), cracking (e.g., thermal fatigue, low-cycle fatigue, high-cycle fatigue, creep rupture), edge-of-contact damage between stationary parts, oxidation or hot corrosion of high-temperature metallic sections, static seal degradation, and creep deformation (e.g., of guide vane sidewalls/airfoils, blade platforms, and blade tip shrouds).

During service intervals, the rotary machines are at least partially disassembled to allow repair and/or replacement of damaged components. For example, damaged components of at least some known rotary machines are primarily repaired at overhaul or component repair facilities, with only limited intervention conducted in the field. Processes used to repair compressor and turbine flowpath components include surface cleaning to remove accumulated dirt and oxidation products, stripping and restoration of coated surfaces, crack repair, section replacement, and aero contouring and smoothing. Repairing the components during service intervals reduces the cost to maintain the rotary machine because the cost to repair components is sometimes less than the cost to replace the components. However, sometimes, the components run past their repair limits between planned service intervals. In addition, sometimes, heavily distressed components fail and cause an unplanned outage.

For at least some known rotary machines, an articulating tethered device, such as a borescope, is inserted through an opening of the rotary machine and manipulated within a cavity of the rotary machine for inspection. However, at least some known tethered devices cannot access all locations of the rotary machine. In particular, some non-rotating components in at least some known rotary machines are difficult to access with conventional tethered devices. Furthermore, damage detected during inspection typically goes unmitigated until the machine is at least partially disassembled for scheduled service.

BRIEF DESCRIPTION

In one aspect, a service apparatus for use in maintaining a turbine assembly is provided. The service apparatus includes a carriage configured to move through a cavity of the turbine assembly, a motorized system coupled to the carriage, and a maintenance device coupled to the motorized system. The motorized system is configured to move the maintenance device relative to the carriage. In some embodiments, the motorized system includes a first motor configured to move the maintenance device in a first direction and a second motor configured to move the maintenance device in a second direction.

In another aspect, a system for maintaining a turbine assembly is provided. The system includes a service apparatus including a carriage configured to move through a cavity of the turbine assembly, a motorized system coupled to the carriage, and a maintenance device coupled to the motorized system. The motorized system is configured to move the maintenance device relative to the carriage. In some embodiments, the motorized system includes a first motor configured to move the maintenance device in a first direction and a second motor configured to move the maintenance device in a second direction. The system also includes a controller for the service apparatus.

In a further aspect, a method of operating a service apparatus for use with a turbine assembly is provided. The method includes providing a carriage configured to move through a cavity of the turbine assembly and positioning a maintenance device relative to the carriage using a motorized system. In some embodiments, the motorized system includes a first motor and a second motor. Positioning the maintenance device includes moving the maintenance device in a first direction using the first motor and moving the maintenance device in a second direction using the second motor.

DRAWINGS

These and other features, aspects, and advantages of the present disclosure will become better understood when the following detailed description is read with reference to the accompanying drawings in which like characters represent like parts throughout the drawings, wherein.

Figure 1:
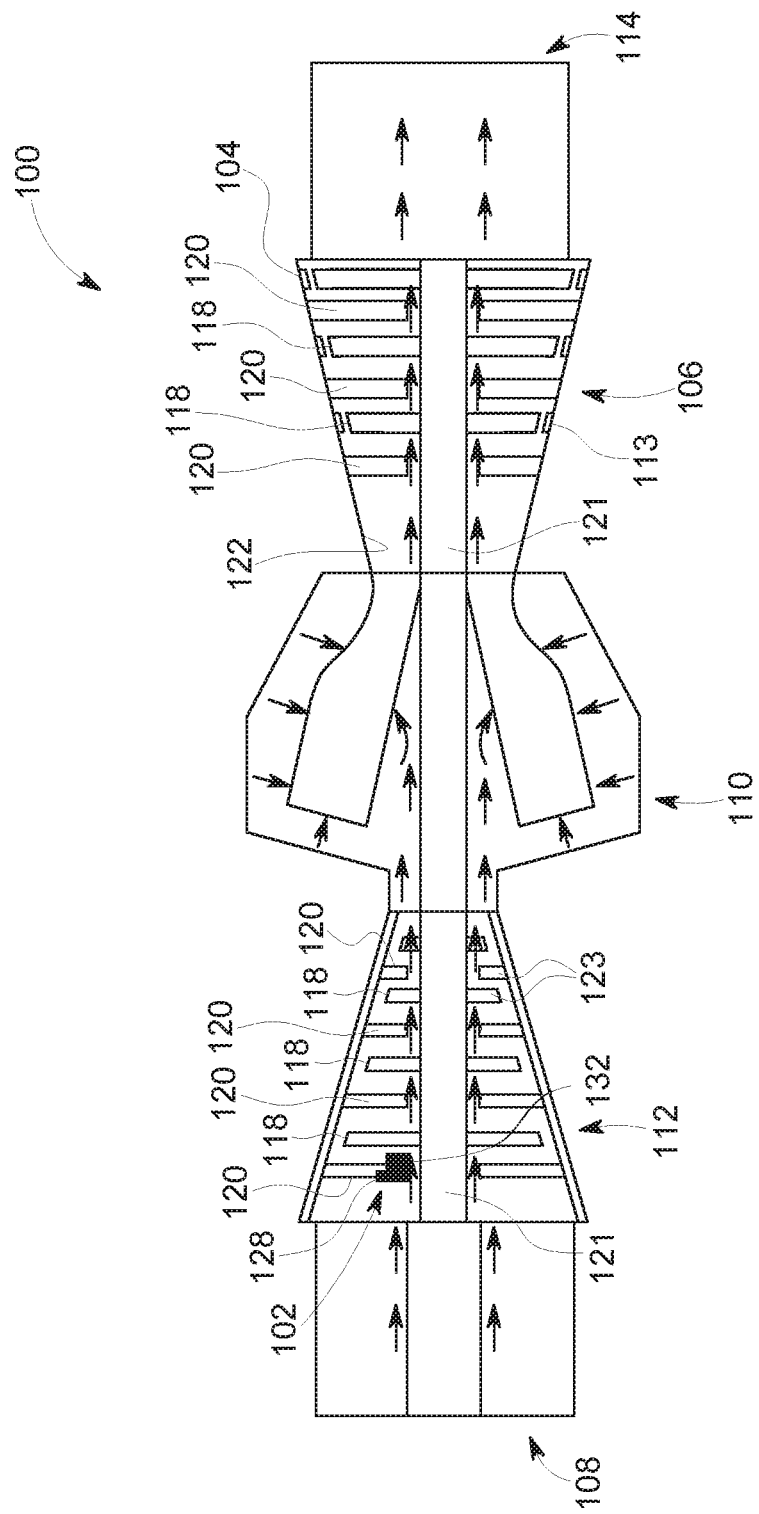
FIG. 1 is a cross-sectional schematic view of an exemplary rotary machine and an exemplary service apparatus.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer," and related terms, e.g., "processing device," "computing device," and "controller" are not limited to just those integrated circuits referred to in the art as a computer, but broadly refers to a microcontroller, a microcomputer, an analog computer, a programmable logic controller (PLC), and application specific integrated circuit (ASIC), and other programmable circuits, and these terms are used interchangeably herein. In the embodiments described herein, "memory" may include, but is not limited to, a computer-readable medium, such as a random access memory (RAM), a computer-readable non-volatile medium, such as a flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a touchscreen, a mouse, and a keyboard. Alternatively, other computer peripherals may also be used that may include, for example, but not be limited to, a scanner. Furthermore, in the exemplary embodiment, additional output channels may include, but not be limited to, an operator interface monitor or heads-up display. Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an ASIC, a PLC, a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. As used herein, the term "motor" is not limited to electrically driven rotary motors, but broadly refers to any device that creates motion, including, for example and without limitation, electric motors, internal combustion engines, sterling cycle engines, pneumatic actuators, hydraulic actuators, shape memory alloys, and electroactive polymers. The above examples are exemplary only, and thus are not intended to limit in any way the definition and/or meaning of the term processor and processing device.

Embodiments described herein provide service apparatus for use in maintaining rotary machines. The service apparatus is configured to fit within and move through a cavity of the rotary machines. The service apparatus includes at least one maintenance device that facilitates repairing and/or inspecting the rotary machine. The maintenance device is coupled to a carriage and includes a motorized system configured to move the maintenance device relative to the carriage. For example, in some embodiments, the motorized system moves the maintenance device in at least three directions relative to the carriage. As a result, the service apparatus provides increased access to locations within the cavity of the rotary machine and reduces the amount of time the rotary machine is out of service for maintenance.

FIG. 1 is a cross-sectional schematic view of an exemplary rotary machine and a service apparatus 102. In the exemplary embodiment, the rotary machine includes a turbine assembly 100. In alternative embodiments, the rotary machine includes any assembly. For example, in some embodiments, the rotary machine includes, without limitation, any of the following: a compressor, a blower, a pump, a turbine, a motor, and a generator.

In the exemplary embodiment, turbine assembly 100 includes an outer case 104, a turbine 106, an inlet 108, a combustor 110, a compressor 112, and an exhaust 114. Fluid flows from inlet 108, through compressor 112, through combustor 110, through turbine 106 and is discharged through exhaust 114. Together, outer case 104, blades 118, guide vanes 120, and shrouds 113 define a primary flowpath inside compressor 112 and turbine 106 of turbine assembly 100. This flowpath, combined with a flowpath through combustor 110, defines a primary cavity within turbine assembly 100. In alternative embodiments, turbine assembly 100 is configured in any manner that enables turbine assembly 100 to operate as described herein.

Also, in the exemplary embodiment, compressor 112 and turbine 106 include airfoils configured to direct fluid through turbine assembly 100. In particular, compressor 112 and turbine 106 include blades 118 and guide vanes 120. Blades 118 are operably coupled with rotating shaft 121 such that blades 118 rotate when rotating shaft 121 rotates. Guide vanes 120 and shrouds 113 are stationary components and are coupled to an inner surface 122 of outer case 104. Blades 118 and guide vanes 120 generally are positioned alternatingly along the rotor axis within turbine assembly 100. In alternative embodiments, compressor 112 and/or turbine 106 includes any airfoils that enable turbine assembly 100 to operate as described herein.

In addition, in the exemplary embodiment, service apparatus 102 is configured to move through turbine assembly 100. Accordingly, service apparatus 102 facilitates maintenance of turbine assembly 100. For example, service apparatus 102 facilitates inspection and repair of turbine assembly 100 at locations within the primary cavity that are difficult to access from an exterior of turbine assembly 100, such as using a borescope. Moreover, service apparatus 102 includes a maintenance device 128 that is positionable to facilitate service apparatus 102 inspecting and/or repairing surfaces of turbine assembly 100.

During operation, service apparatus 102 enters turbine assembly 100 through any suitable access port or opening of turbine assembly 100. For example, in some embodiments, service apparatus 102 enters and/or exits turbine assembly 100 through any of inlet 108, exhaust 114, and/or an access port, such as an igniter, borescope, or fuel nozzle port. In the exemplary embodiment, service apparatus 102 is sized and shaped to fit within turbine assembly 100 (shown in FIG. 1) and to travel through said turbine assembly 100, such as through the primary cavity of said turbine assembly (shown in FIG. 1). For example, service apparatus 102 has a height, length, and width that are less than a clearance required to fit within the primary cavity. In alternative embodiments, service apparatus 102 is any size and shape that enables service apparatus 102 to operate as described herein.

During operation, service apparatus 102 is used to inspect and/or repair interior components of turbine assembly 100. For example, in some embodiments, service apparatus 102 is positioned adjacent a portion of interior surface 123 of turbine assembly 100. Interior surface 123 is any surface within the primary cavity of turbine assembly 100. For example, in some embodiments, interior surface 123 includes, without limitation, surfaces of blades 118, guide vanes 120, shrouds 113, and combustor 110. In some embodiments, service apparatus 102 detects a characteristic of interior surface 123. For example, in some embodiments, service apparatus 102 is used to generate an image of interior surface 123 and the image data is examined to determine whether repairs are necessary. If repairs are necessary, service apparatus 102 can be used to repair interior surface 123. For example, in some embodiments, service apparatus 102 patches a damaged portion of interior surface 123. After inspection and/or repair of interior surface 123, service apparatus 102 exits turbine assembly 100 through any suitable access port or opening of turbine assembly 100.

Service apparatus 102 is positioned and moved within the primary cavity in any manner that enables service apparatus 102 to operate as described herein. For example, in some embodiments, a component (not shown), such as a tether, extends from service apparatus 102 to the exterior of turbine assembly 100 for an operator to control service apparatus 102 and move service apparatus 102 within the primary cavity. In some embodiments, service apparatus 102 includes its own propulsion system to move service apparatus 102 within the primary cavity.

Figure 2:
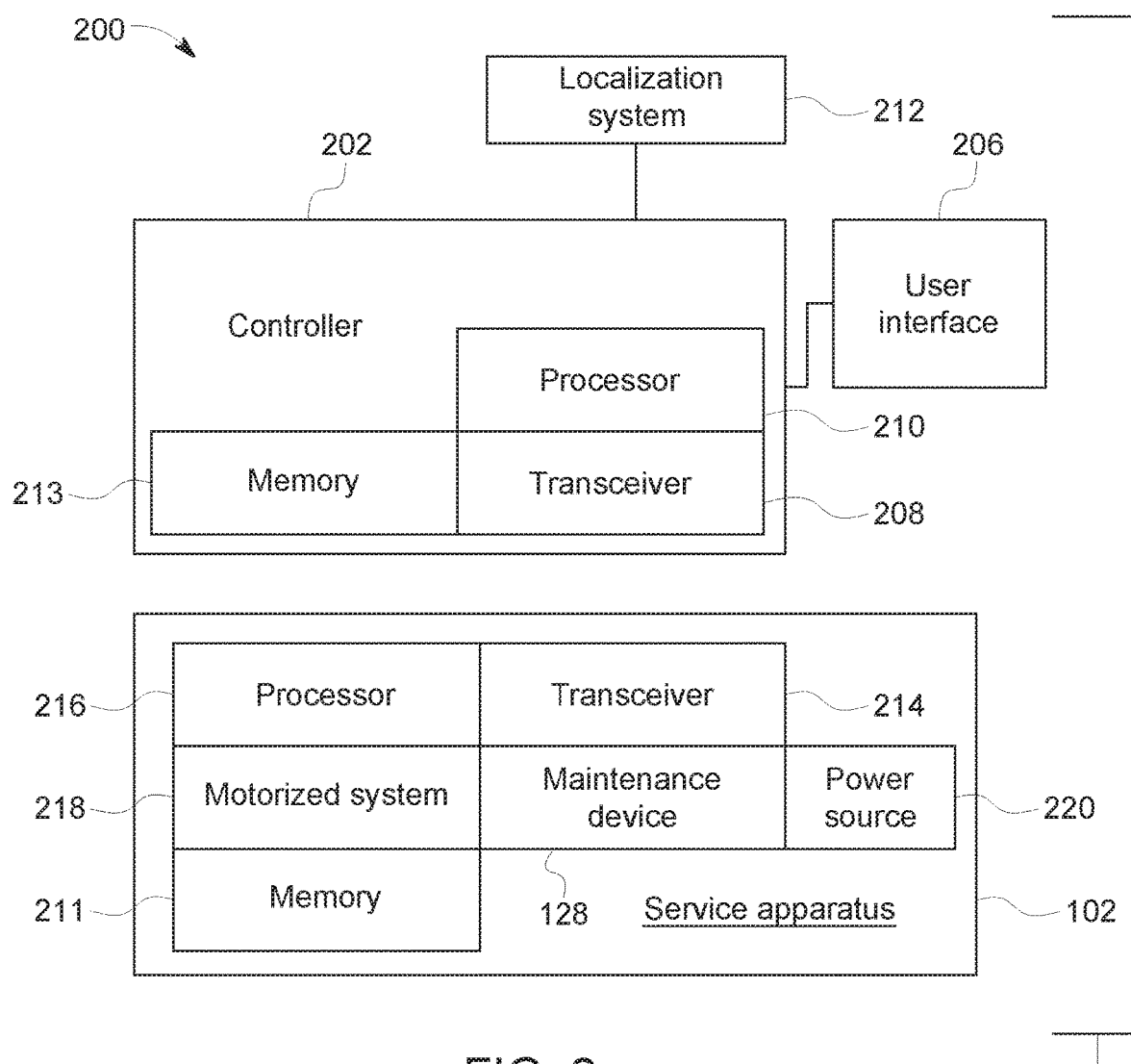
FIG. 2 is a schematic view of exemplary system for use in maintaining the rotary machine shown in FIG. 1.

FIG. 2 is a schematic view of an exemplary system 200 for use in maintaining turbine assembly 100 (shown in FIG. 1). System 200 includes service apparatus 102, a controller 202, a user interface 206, and a localization system 212. Service apparatus 102 includes maintenance device 128 and motorized system 218. In alternative embodiments, system 200 includes any component that enables system 200 to operate as described herein. For example, in some embodiments, maintenance device 128 is omitted. In further embodiments, user interface 206 is omitted.

In the exemplary embodiment, motorized system 218 is coupled to maintenance device 128 and is configured to position maintenance device 128. In particular, motorized system 218 moves maintenance device 128 relative to at least one axis of service apparatus 102. For example, in some embodiments, motorized system 218 pivots maintenance device 128 about an axis. In further embodiments, motorized system 218 moves maintenance device 128 in a direction parallel to or perpendicular to the axis. As a result, motorized system 218 facilitates positioning maintenance device 128 during operation of service apparatus 102. In some embodiments, motorized system 218 exchanges signals with and is controlled by controller 202. In alternative embodiments, service apparatus 102 includes any motorized system 218 that enables service apparatus 102 to operate as described herein.

In addition, in the exemplary embodiment, controller 202 includes a transceiver 208, a processor 210, and memory 213. Transceiver 208 is communicatively coupled with service apparatus 102 and is configured to send information to and receive information from a transceiver 214 of service apparatus 102. In the exemplary embodiment, transceiver 208 and transceiver 214 communicate wirelessly. In alternative embodiments, service apparatus 102 and controller 202 communicate in any manner that enables system 200 to operate as described herein. For example, in some embodiments, controller 202 and service apparatus 102 exchange information through a wired link extending between service apparatus 102 and controller 202.

Also, in the exemplary embodiment, controller 202 is positioned remotely from service apparatus 102. In particular, controller 202 is positioned on the exterior of turbine assembly 100 (shown in FIG. 1). In alternative embodiments, controller 202 is positioned anywhere that enables system 200 to operate as described herein. For example, in some embodiments, controller 202 is positioned at least partially within the primary cavity, such as within the exhaust 114 or inlet 108.

In some embodiments, maintenance device 128 includes one or more sensors and/or repair tools. For example, in the exemplary embodiment, maintenance device 128 is configured to detect a characteristic of turbine assembly 100 (shown in FIG. 1) and/or service apparatus 102 and generate a signal relating to the characteristic. Transceiver 208 is in communication with maintenance device 128 and is configured to receive signals relating to the characteristic detected by maintenance device 128. In alternative embodiments, system 200 includes any maintenance device 128 that enables system 200 to operate as described herein, including but not limited to executing non-destructive evaluation, repair, and cleaning. For example, in some embodiments, maintenance device 128 of service apparatus 102 includes, without limitation, any of the following: an applicator, a drill, a grinder, a heater, a welding electrode, a sprayer, an optical sensor (e.g., visible, infrared, and/or multi-spectral sensor), a mechanical sensor (e.g., stylus profilometer, coordinate measurement probe, load transducer, linear variable differential transformer), a thermal sensor (e.g., pyrometer, thermocouple, resistance temperature detector), a magnetic sensor, an acoustic sensor (e.g., piezoelectric, microphone, ultrasound), and an electromagnetic sensor (e.g., eddy current, potential drop, x-ray).

In addition, in the exemplary embodiment, service apparatus 102 includes a processor 216 and a memory 211. Processor 216 is configured to execute instructions for controlling components of service apparatus 102, such as maintenance device 128 and motorized system 218. In alternative embodiments, service apparatus 102 includes any processor 216 that enables system 200 to operate as described herein. In some embodiments, processor 216 is omitted.

Also, in the exemplary embodiment, user interface 206 is configured to display information relating to the characteristics detected by maintenance device 128 for interpretation by the user. For example, in some embodiments, user interface 206 displays images of interior surface 123 of turbine assembly 100 based on received signals. In some embodiments, user interface 206 allows a user to input and/or view information relating to control of service apparatus 102. In an exemplary embodiment, user interface 206 is configured to display information relating to the state of one or more of maintenance device 128 and a power source 220 for interpretation by the user. For example, state information may include the position of maintenance device 128 relative to carriage 132 of the service apparatus. State information may also include charge status of power source 220 and/or current draw on the various drive and positioning motors. Processor 210 translates user inputs into steering, tool motion, camera control, sensor control, sensor motion, and/or any other commands and sends information via transceiver 208 to service apparatus 102 via transceiver 214. In some embodiments, user control of service apparatus 102 is in real time, such as through a joystick, keyboard, touchscreen or other interface having similar function. In other embodiments, service apparatus 102 is controlled partially or wholly according to a pre-programmed routine. In some embodiments, a user inputs information, such as operation goals or conditional directions and service apparatus 102 is at least partially automated. In further embodiments, information, such as information received by controller 202 from service apparatus 102, control data sent to service apparatus 102, and additional user inputs or state information (e.g., location, time, orientation, datalink quality, battery levels, repair material levels, failure mode indicators), is logged into memory 211 and/or memory 213.

In addition, in the exemplary embodiment, localization system 212 determines a position of service apparatus 102 relative to turbine assembly 100 based on information received from service apparatus 102. In further embodiments, localization system 212 determines a position of maintenance device 128 and/or carriage 132 of the service apparatus relative to interior surface 123 of turbine assembly 100. In some embodiments, localization system 212 indirectly detects a position of service apparatus 102 based on characteristics detected by maintenance device 128 and/or additional sensors, such as proximity sensors, located on service apparatus 102. For example, in some embodiments, maintenance device 128 includes a camera and localization system 212 determines a position of service apparatus 102 based on an image of a portion of turbine assembly 100 visible to service apparatus 102, such as by comparing the image data to a model of the turbine assembly 100. In alternative embodiments, localization system 212 determines a position of service apparatus 102 in any manner that enables service apparatus 102 to operate as described herein. For example, in some embodiments, localization system 212 utilizes pre-existing or purposefully placed landmarks within turbine assembly 100 to determine a position of service apparatus 102. In further embodiments, devices such as borescopes and/or illuminators are positioned through access ports (not shown) in outer case 104 to facilitate localization system 212 determining a position of service apparatus 102. In some embodiments, localization system 212 utilizes radiography to facilitate determining a position of service apparatus 102.

Figure 3:
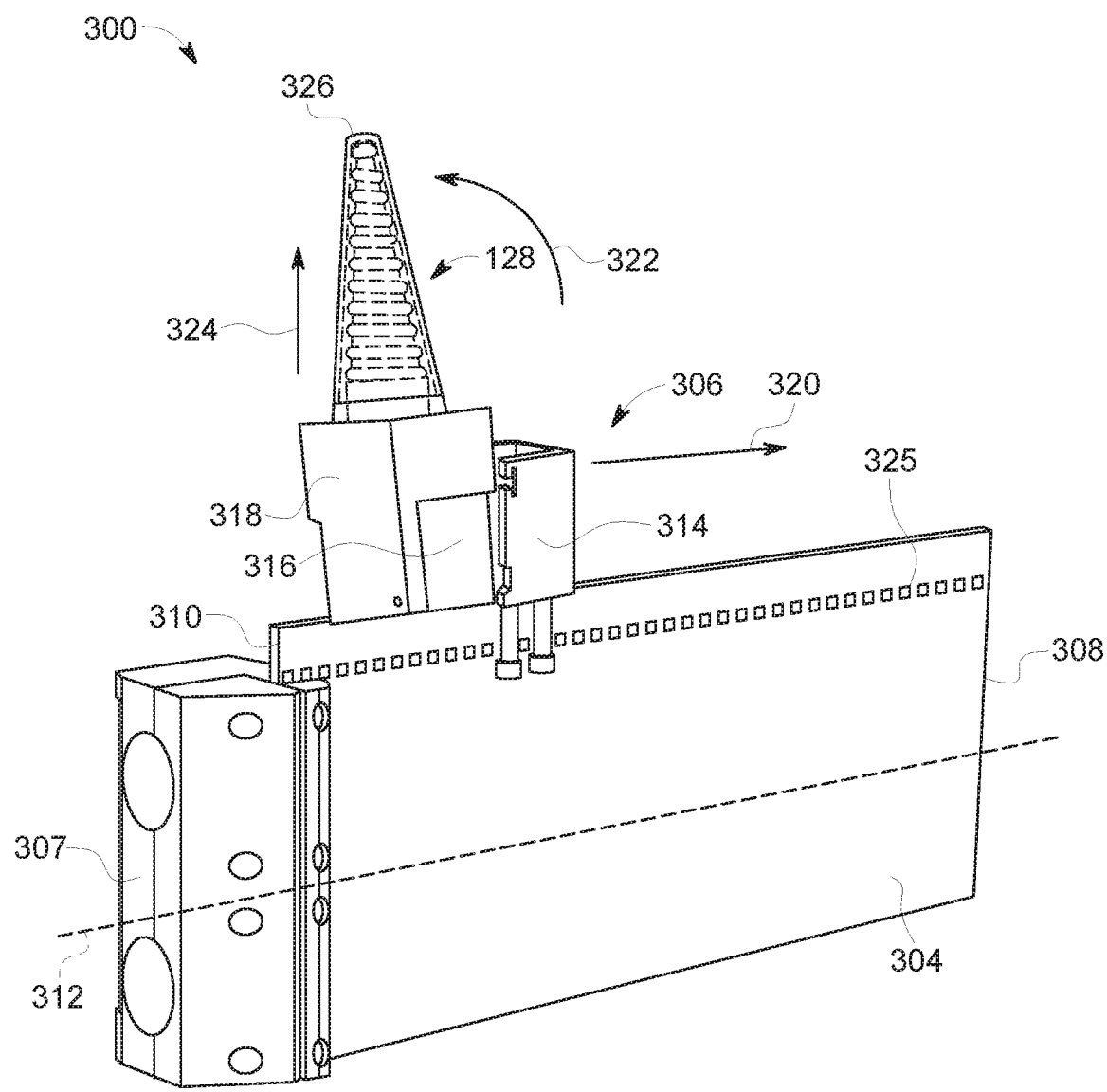
FIG. 3 is a perspective view of an alternative embodiment of a service apparatus for use with the rotary machine shown in FIG. 1.

FIG. 3 is a perspective view of an alternative embodiment of a service apparatus 300 for use with turbine assembly 100 (shown in FIG. 1). Service apparatus 300 includes maintenance device 128, a carriage 304, a motorized trolley system 306, and a mount 307. In alternative embodiments, service apparatus 300 includes any component that enables service apparatus 300 to operate as described herein.

In reference to FIGS. 1 and 3, in the exemplary embodiment, service apparatus 300 is configured to move through the primary cavity of turbine assembly 100. In some embodiments, service apparatus 300 enters turbine assembly 100 through inlet 108. In further embodiments, service apparatus 300 enters turbine assembly 100 through combustor 110 or exhaust 114. In the exemplary embodiment, service apparatus 300 is positioned within the primary cavity by an insertion device (not shown), releasably coupled to mount 307 and including, without limitation, any of the following: a rod, a cable, and a tube. Service apparatus 300 is configured for positioning between adjacent airfoils. In some embodiments, the insertion device (not shown) and carriage 304 are flexible to allow the insertion device to bring service apparatus 300 into proximity of a target location between adjacent airfoils. In some embodiments, rotation of rotating shaft 121 is used to bring service apparatus 300 into proximity of the target turbine components of turbine assembly 100 to inspect and/or repair. In alternative embodiments, service apparatus 300 is positioned within the primary cavity in any manner that enables service apparatus 300 to operate as described herein.

In reference to FIG. 3, in the exemplary embodiment, carriage 304 extends between a front end 308 and a rear end 310 of service apparatus 300. Carriage 304 is elongated along a longitudinal axis 312 of service apparatus 300. In addition, carriage 304 is generally rectangular in shape and includes a thin strip of flexible material. In alternative embodiments, service apparatus 300 includes any carriage 304 that enables service apparatus 300 to operate as described herein. For example, in some embodiments, carriage 304 is made of multiple pieces of flexible and/or non-flexible material operably coupled together with hinges, elastic spring elements, magnets or any other coupling component.

Also, in the exemplary embodiment, carriage 304 is coupled to and supports maintenance device 128. Maintenance device 128 is configured to inspect and/or repair one or more surfaces of turbine assembly 100 (shown in FIG. 1). In addition, motorized trolley system 306 is operably coupled to maintenance device 128 and carriage 304. Motorized trolley system 306 is configured to move maintenance device 128 relative to carriage 304. Motorized trolley system 306 includes an axial traverse motor 314 (broadly a first motor), a pivot motor 316 (broadly a second motor), and an extension-dispense motor 318 (broadly a third motor). Motorized trolley system 306 is configured to couple to and receive signals from controller 202 (shown in FIG. 2). For example, in some embodiments, controller 202 (shown in FIG. 2) controls operations of one or more of axial traverse motor 314, pivot motor 316, and extension-dispense motor 318 of motorized trolley system 306. In alternative embodiments, motorized trolley system 306 is controlled in any manner that enables service apparatus 300 to operate as described herein.

In addition, in the exemplary embodiment, axial traverse motor 314, pivot motor 316, and extension-dispense motor 318 are configured to position maintenance device 128 and facilitate maintenance device 128 accessing a 3-dimensional space within turbine assembly 100 (shown in FIG. 1). Specifically, in the exemplary embodiment, axial traverse motor 314, pivot motor 316, and extension-dispense motor 318 allow maintenance device 128 to axially move, pivot, and extend relative to carriage 304. For example, axial traverse motor 314 of motorized trolley system 306 moves maintenance device 128 generally along longitudinal axis 312 of service apparatus 300 in a direction indicated by arrow 320. In some embodiments, carriage 304 may be curved and axial traverse motor 314 may move maintenance device 128 along a curve of carriage 304. Pivot motor 316 pivots maintenance device 128 about longitudinal axis 312 in a direction indicated by arrow 322. Extension-dispense motor 318 extends maintenance device 128 in a direction away from carriage 304 indicated by arrow 324.

During operation, in the exemplary embodiment, axial traverse motor 314 moves maintenance device 128 to a position along carriage 304 between front end 308 and rear end 310 of service apparatus 300. Pivot motor 316 pivots maintenance device at an angle relative to carriage 304. Extension-dispense motor 318 extends or retracts maintenance device 128 in direction 324 perpendicular to longitudinal axis 312 to a desired radial position. Accordingly, motorized trolley system 306 positions maintenance device 128 at a desired position in a 3-dimensional space within turbine assembly 100 (shown in FIG. 1). As a result, motorized trolley system 306 facilitates maintenance device 128 reaching a surface of turbine assembly 100 (shown in FIG. 1). In addition, motorized trolley system 306 is compact in size to facilitate service apparatus 300 operating within the primary cavity (shown in FIG. 1). In alternative embodiments, service apparatus 300 includes any motorized trolley system 306 that enables service apparatus 300 to operate as described herein.

In reference to FIGS. 1 and 3, in the exemplary embodiment, maintenance device 128 is configured to repair a surface of turbine assembly 100. For example, service apparatus 300 is positioned in general proximity of the region of turbine assembly 100 requiring repair. Axial traverse motor 314, pivot motor 316, and/or extension-dispense motor 318 position maintenance device 128 adjacent to the interior surface of turbine assembly 100 that needs repair. In some embodiments, the region within turbine assembly 100 requiring repair includes, without limitation, any of the following: cracks, coating loss, surface foulant accumulation, worn surfaces, and/or any other deterioration. For example, in some embodiments, repair material is applied onto the interior surface of turbine assembly 100 in order to repair such region.

In reference to FIG. 3, in the exemplary embodiment, axial traverse motor 314 is coupled to carriage 304 such that axial traverse motor 314 operably engages track 325 of carriage 304. Track 325 includes a linear array of rectangular holes. During operation, axial traverse motor 314 induces motorized trolley system 306, carrying maintenance device 128, to travel along carriage 304 generally in the direction indicated by longitudinal axis 312. For example, in some embodiments, axial traverse motor 314 drives a sprocket that engages with track 325 in carriage 304. In alternative embodiments, service apparatus 300 includes any axial traverse motor 314 and/or traction system, such as a pinch roller, belt or gear, that enables service apparatus 300 to operate as described herein.

Also, in the exemplary embodiment, maintenance device 128 is rotatably coupled to pivot motor 316. During operation, pivot motor 316 induces maintenance device 128 to pivot or rotate relative to longitudinal axis 312 of carriage 304. For example, in some embodiments, pivot motor 316 includes a rotatory actuator and a rotor coupled to maintenance device 128. Maintenance device 128 pivots when the rotor is rotated. In alternative embodiments, service apparatus 300 includes any pivot motor 316 that enables service apparatus 300 to operate as described herein.

In addition, in the exemplary embodiments, maintenance device 128 is coupled to an end of extension-dispense motor 318 and is moved by extension-dispense motor 318. For example, in some embodiments, extension-dispense motor 318 includes a linear actuator that induces maintenance device 128 to move linearly. In alternative embodiments, service apparatus 300 includes any extension-dispense motor 318 that enables service apparatus 300 to operate as described herein.

Moreover, in the exemplary embodiment, axial traverse motor 314, pivot motor 316, and extension-dispense motor 318 are operably coupled to each other and to maintenance device 128. Thus, operation of axial traverse motor 314 axially translates pivot motor 316, extension-dispense motor 318 and maintenance device 128. In addition, operation of pivot motor 316 pivots extension-dispense motor 318 and maintenance device 128. In alternative embodiments, axial traverse motor 314, pivot motor 316, and extension-dispense motor 318 of motorized trolley system 306 are coupled to maintenance device 128 in any manner that enables service apparatus 300 to operate as described herein.

Figure 4:
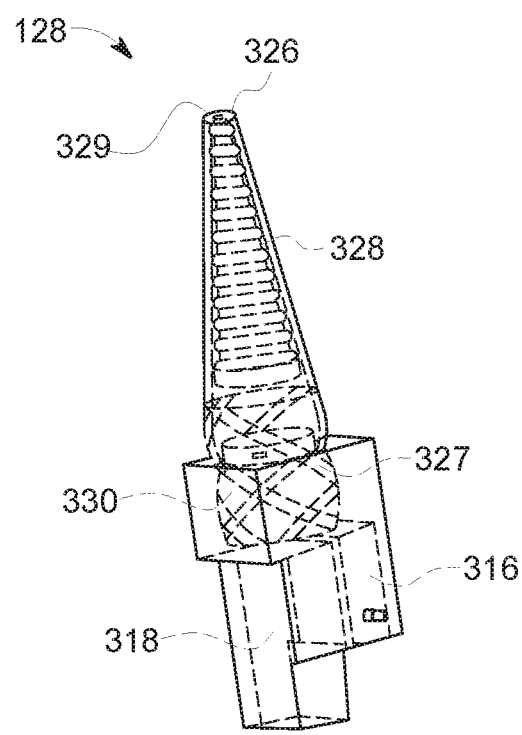
FIG. 4 is a perspective view of a maintenance device of the service apparatus shown in FIG. 3.

FIG. 4 is a perspective view of maintenance device 128. Maintenance device 128 includes a nozzle 326, a screw extruder 328, and a reservoir 330. Nozzle 326 extends in a direction generally away from carriage 304 and normal to longitudinal axis 312 (shown in FIG. 3). Moreover, pivot motor 316 is configured to pivot maintenance device 128 such that nozzle 326 pivots about longitudinal axis 312. Nozzle 326 is coupled to reservoir 330 contained within maintenance device 128. Reservoir 330 contains repair material. For example, in some embodiments, reservoir 330 contains repair slurry, braze paste, and/or any other repair material. Reservoir 330 is operably coupled to nozzle 326 such that repair material moves from reservoir 330 through nozzle 326 and is dispensed via nozzle orifice 329 onto an interior surface of turbine assembly 100 (shown in FIG. 1). In alternative embodiments, maintenance device 128 includes any nozzle 326 and reservoir 330 that enables maintenance device 128 to operate as described herein.

In the exemplary embodiment, screw extruder 328 is rotated using extension-dispense motor 318. The housing base of nozzle 326 includes helical splines 327 that engage with threads on the mating section of reservoir 330. These splines 327 are configured to engage extruder 328 and are oriented counter to a screw pitch of extruder 328. Repair material acts against nozzle 326 and functions as a clutching medium when extruder 328 is rotated by the extension-dispense motor 318, causing the screw extruder and nozzle 326 to extend. Further extension and rotation of nozzle 326 is prevented when the tip of nozzle 326 makes contact with the surface to be repaired. When rotation of nozzle 326 is prevented, the rotation of extruder 328 induces repair material to move through orifice 329 of nozzle 326 and onto the surface to be repaired. In some embodiments, a wiper 702 (shown in FIG. 8) is operated in coordination with nozzle 326 to level repair material on the surface using, for example, the motion of rotating shaft 121, pivot motor 316, and/or axial traverse motor 314. In combination, axial traverse motor 314 (shown in FIG. 3), rotating shaft 121, and pivot motor 316 move maintenance device 128 in three-dimensional space. In alternative embodiments, maintenance device 128 operates in any manner that enables service apparatus 300 (shown in FIG. 3) to operate as described herein.

In the exemplary embodiment, extruder 328 is rotated by extension-dispense motor 318. In alternative embodiments, maintenance device 128 includes any motor that enables service apparatus 300 to operate as described herein. For example, in some embodiments, service apparatus 300 includes separate motors for extension and operation of maintenance device 128.

Figure 5:
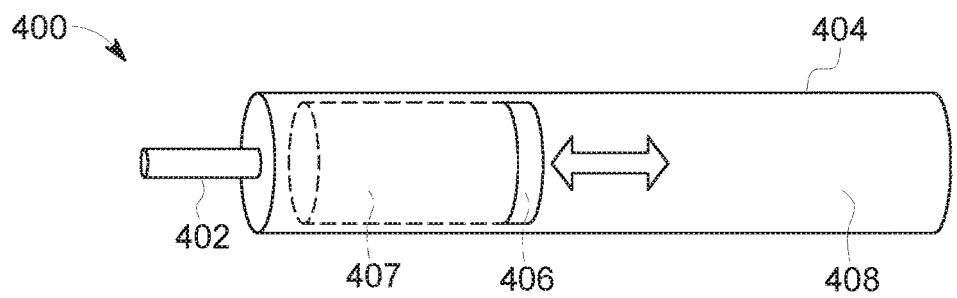
FIG. 5 is a schematic view of an alternative embodiment of a maintenance device for use with the service apparatus shown in FIG. 3.

FIG. 5 is a perspective view of an alternative maintenance device 400 for use with service apparatus 300 (shown in FIG. 3). Maintenance device 400 includes a nozzle 402, a reservoir housing 404, and a plunger 406. Reservoir housing 404 defines an interior space 408. Plunger 406 is movably disposed within interior space 408. In particular, plunger 406 moves longitudinally relative to reservoir housing 404, transporting repair material 407 along interior space 408 and through the dispense nozzle 402. In alternative embodiments, maintenance device 400 operates in any manner that enables service apparatus 300 (shown in FIG. 3) to operate as described herein. For example, reservoir housing 404 may include an integral nozzle opening and may be of arbitrary length or flexibility. Additionally, plunger 406 may be absent and repair material 407 may be transported by squeezing deformable reservoir housing 404, such as using pinch rollers. In some embodiments, plunger 406 or pinch rollers may be driven by a motorized actuator (not shown).

Figure 6:
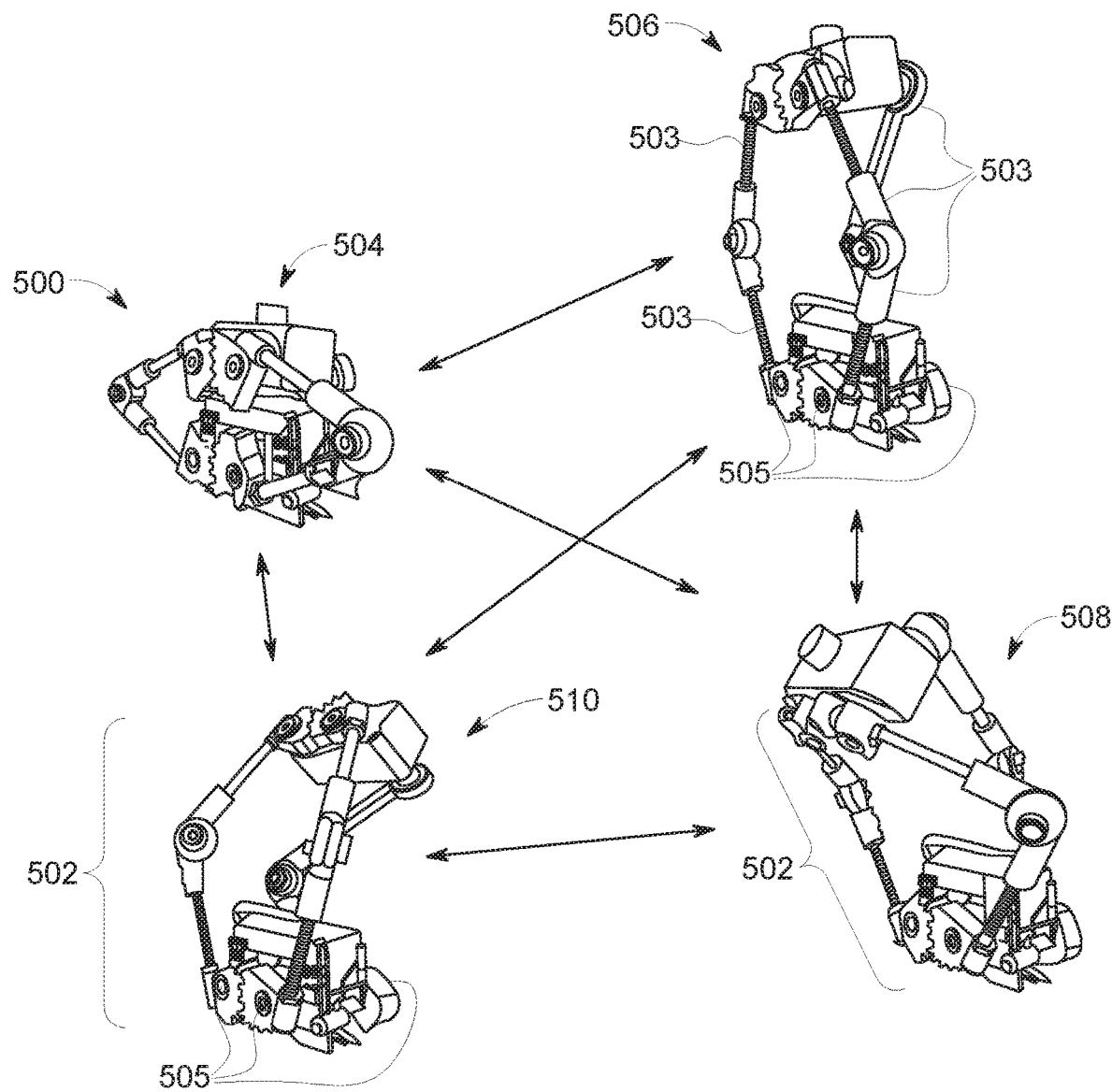
FIG. 6 is a schematic view of an alternative embodiment of a motorized system for use with the service apparatus shown in FIG. 3 including rotary actuators.

FIG. 6 is a schematic view of an alternative motorized system 500 for use with service apparatus 300 (shown in FIG. 3) that includes rotary actuators 502. Rotary actuators 502 consist of drive motors 505 and driven linkages 503. Motorized system 500 is configured to couple to service apparatus 300 (shown in FIG. 3). Rotary actuators 502 are configured to move maintenance device 128 (shown in FIG. 3) or alternative maintenance device 400 (shown in FIG. 5) in three-dimensional space. For example, motorized system 500 is positionable between a stowed position 504, an extended position 506, a first reaching position 508, and a second reaching position 510. In combination with axial traverse motor 314 (shown in FIG. 3), rotary actuators 502 are controlled in unison to induce motorized system 500 to move maintenance device 128 or alternative maintenance device 400 in at least three directions. In alternative embodiments, motorized system 500 is positionable in any manner that enables motorized system 500 to operate as described herein.

Figure 7:
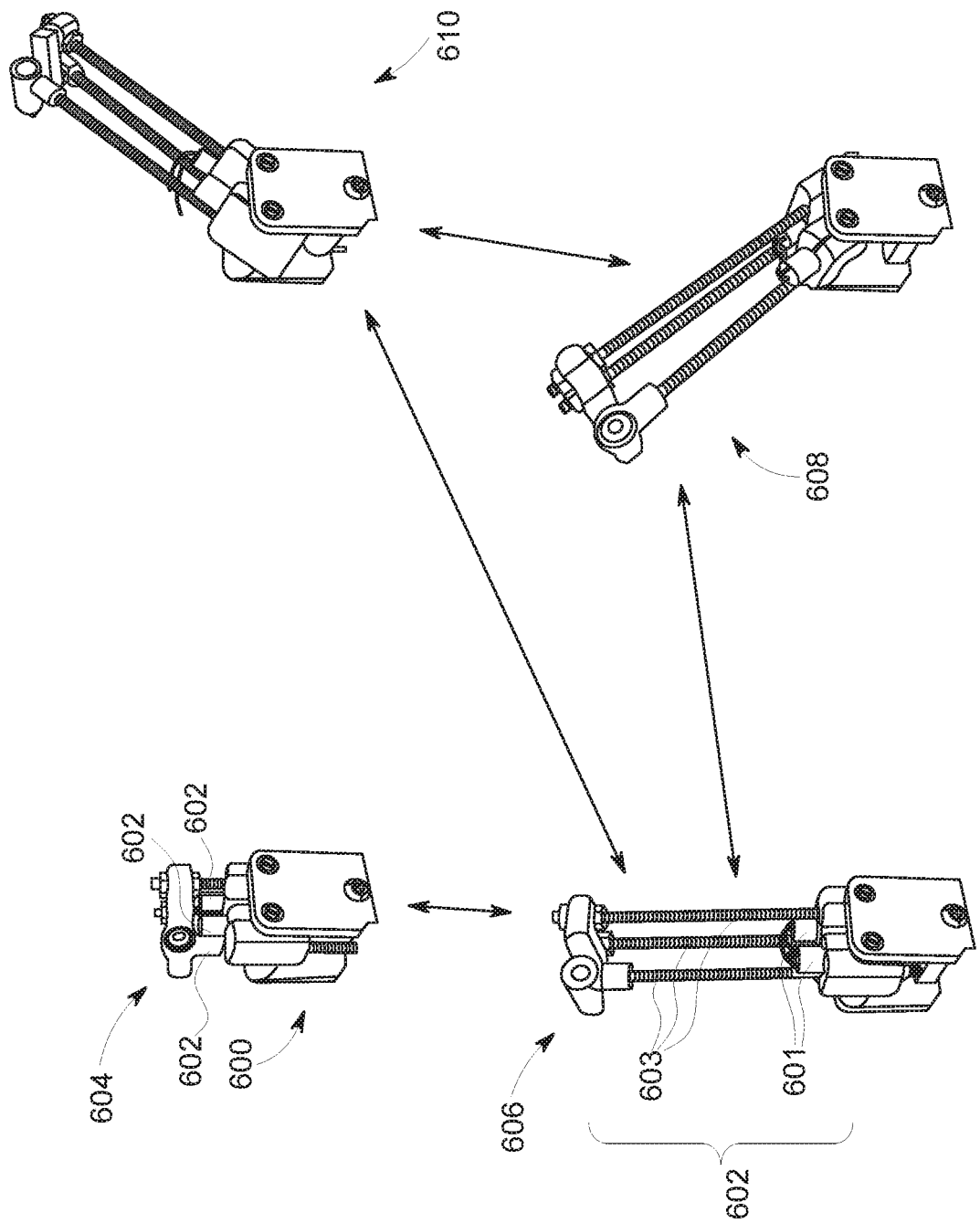
FIG. 7 is a schematic view of an alternative embodiment of a motorized system for use with the service apparatus shown in FIG. 3 including linear actuators.

FIG. 7 is a schematic view of an alternative motorized system 600 for use with service apparatus 300 (shown in FIG. 3) including linear actuators. Motorized system 600 is configured to couple to service apparatus 300 (shown in FIG. 3) and position maintenance device 128 or alternative maintenance device 400 (shown in FIG. 5). Linear actuators 602 consist of motors 601 that turn a captive threaded gear around threaded rods 603 to regulate the length of the threaded rods 603. In combination with axial traverse motor 314 (shown in FIG. 3), linear actuators 602 include drive components configured to move linearly to induce motorized system 600 to move maintenance device 128 (shown in FIG. 3) or alternative maintenance device 400 (shown in FIG. 5) in three-dimensional space. For example, motorized system 600 is positionable between a stowed position 604, an extended position 606, a first reaching position 608, and a second reaching position 610. Linear actuators 602 and axial traverse motor 314 (shown in FIG. 3) are controlled in unison to enable motorized system 600 to move in at least three directions. In alternative embodiments, motorized system 600 is positionable in any manner that enables motorized system 600 to operate as described herein.

Figure 8:
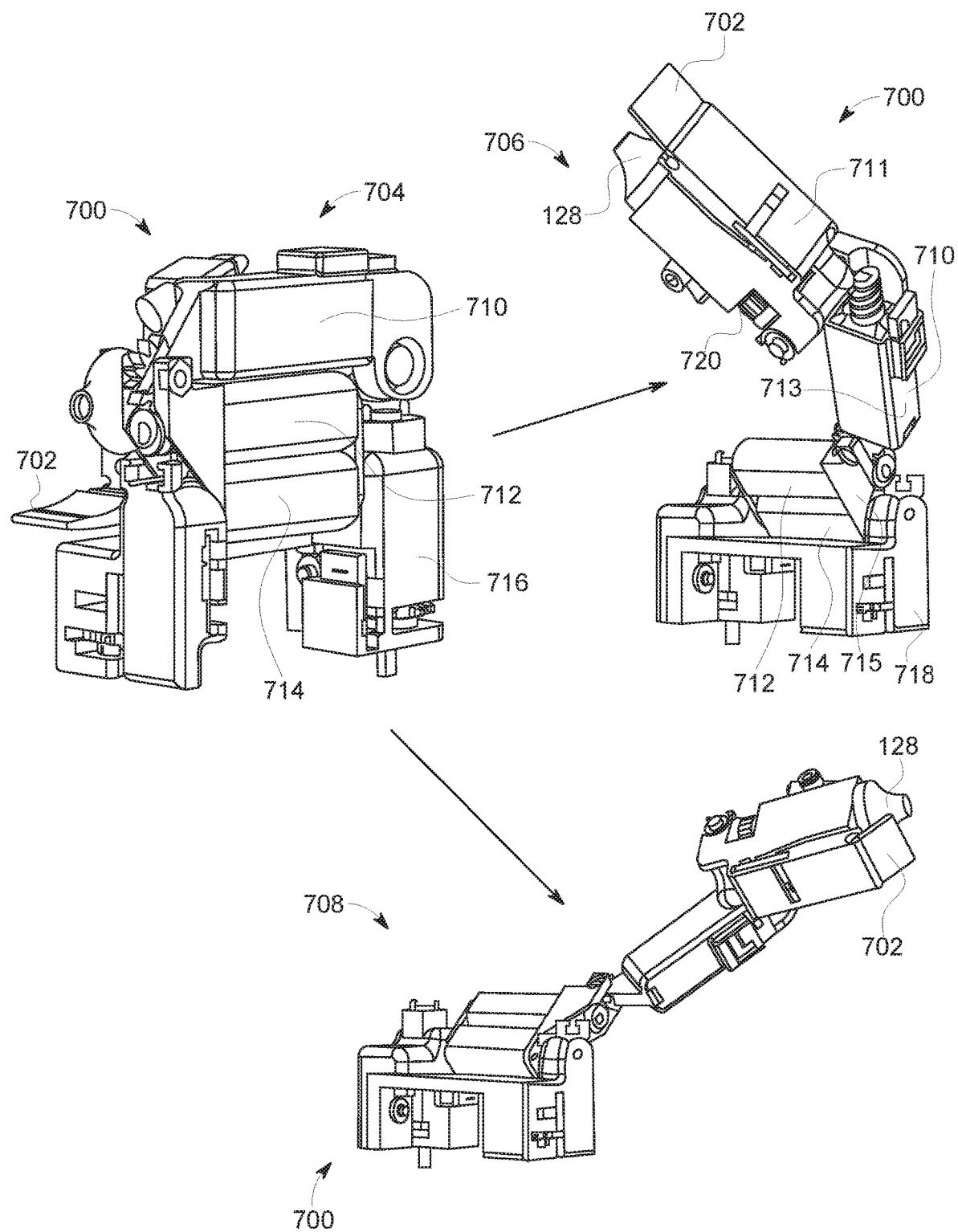
FIG. 8 is a schematic view of an alternative embodiment of a motorized system for use with the service apparatus shown in FIG. 3 including rotary actuators.

FIG. 8 is a schematic view of an alternative motorized system 700 for use with service apparatus 300 (shown in FIG. 3) including rotary actuators. Motorized system 700 is configured to couple to service apparatus 300 (shown in FIG. 3) and position maintenance device 128. For example, motorized system 700 is positionable between a stowed position 704 and extended positions 706, 708. In the exemplary embodiment, motorized system 700 includes three rotary actuators, each including a motor and a linkage. Independently controlled extension motors 710 and 712, and pivot motor 714, are coupled to linkages 711, 713 and 715, respectively. Rotation motor 714 drives a rotation between the translation stage 718 and linkage 715. Linkage 715 houses motors 714 and 712. Rotation motor 712 drives a rotation between linkage 715 and linkage 713. Linkage 713 houses motor 710. Motor 710 drives a rotation between linkage 713 and linkage 711. Linkage 711 houses the maintenance device 128. In combination with axial traverse motor 716, extension motors 710, 712 and pivot motor 714 enable motorized system 700 to move maintenance device 128 in three-dimensional space. In some embodiments, a wiper 702 is operated in coordination with maintenance device 128 to apply and level repair material on the repair surface. Motor 720 drives maintenance device 128 to dispense repair material to the repair location. In alternative embodiments, motorized system 700 is positionable in any manner that enables motorized system 700 to operate as described herein.

Figure 9:
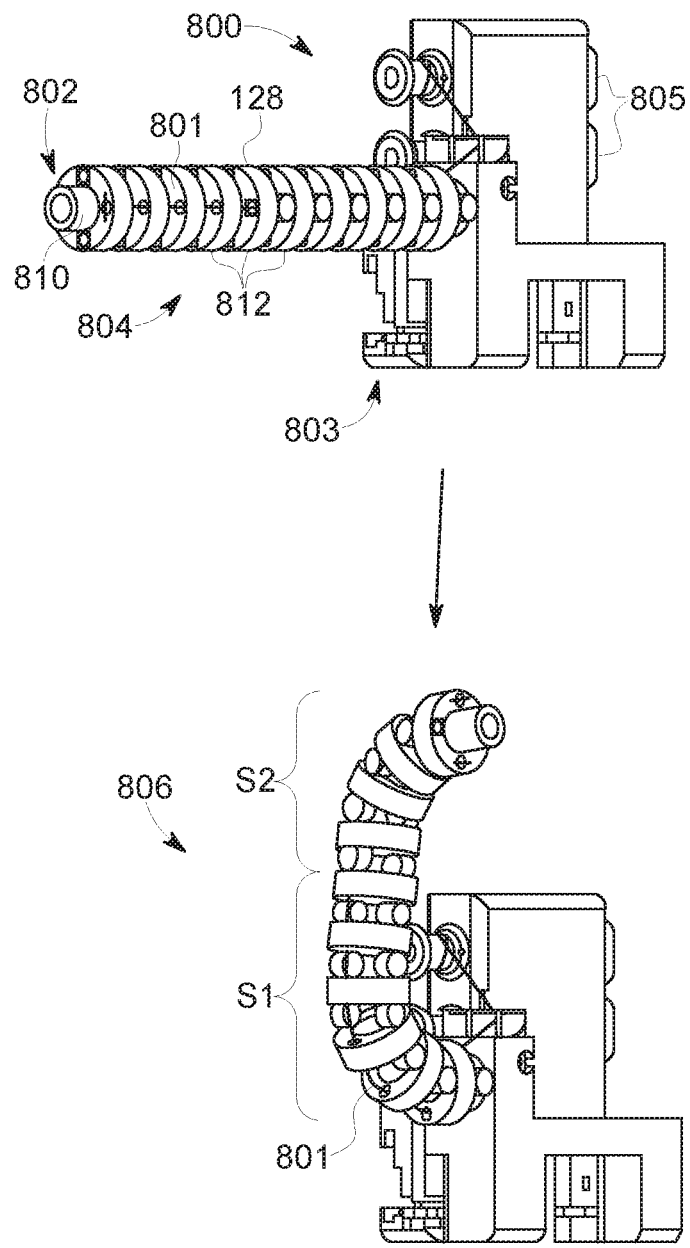
FIG. 9 is a schematic view of an alternative embodiment of a motorized system for use with the service apparatus shown in FIG. 3 including tendon actuators.

FIG. 9 is a schematic view of an alternative motorized system 800 for use with service apparatus 300 (shown in FIG. 3) including tendon actuators. In combination with axial traverse motor 803, motorized system 800 includes motors 805 that regulate the length of tendons 801 configured to position maintenance device 128 in three-dimensional space. For example, motorized system 800 is positionable between a stowed position 804 and an extended position 806. In alternative embodiments, motorized system 800 is positionable in any manner that enables motorized system 800 to operate as described herein.

In the exemplary embodiment, motorized system 800 includes motors 805 and a maintenance device 128 that includes a flexible hollow tube 810 and links 812. The links 812 are arranged so as to include a plurality of flexible segments (e.g., S1, S2). Links 812 circumscribe hollow tube 810 and are connected by tensioned tendons 801, such as cables, to allow positioning of end effector 802 of maintenance device 128 by regulating tendon lengths. For example, during operation, motors 805 of motorized system 800 manipulate ends of the tensioned tendons 801 to cause end effector 802 to move. When end effector 802 is in a desired position, maintenance device 128 dispenses repair material to the desired location. Each motor 805 controls the radius of one flexible segment (e.g., S1, S2) of maintenance device 128 in a single plane. At least two motors 805 are combined with axial traverse motor 803 to allow the maintenance device 128 to access three-dimensional space. In alternative embodiments, motorized system 800 positions any end effector 802 that enables service apparatus 300 (shown in FIG. 3) to operate as described herein. For example, in some embodiments, any number of flexible segments may be arranged to form maintenance device 128. In further embodiments, flexible segments S1, S2 may be configured to bend relative to each other in any plane and each motor may simultaneously drive the curvature of one or more segments.

In reference to FIGS. 1-3, a method of assembling service apparatus 102 includes providing carriage 132 configured to move within the primary cavity of turbine assembly 100. The method also includes coupling motorized trolley system 306 to carriage 132. The method further includes coupling maintenance device 128 to motorized trolley system 306 to facilitate maintenance device 128 moving relative to carriage 132. In further embodiments, the method includes coupling maintenance device 128 to axial traverse motor 314, pivot motor 316, and/or extension-dispense motor 318.

The above described embodiments provide service apparatus for use in maintaining rotary machines. The service apparatus is configured to fit within and move through a cavity of the rotary machines. The service apparatus includes at least one maintenance device that facilitates repairing and/or inspecting the rotary machine. The maintenance device is coupled to a carriage and includes a motorized system configured to move the maintenance device relative to the carriage. For example, in some embodiments, the motorized system moves the maintenance device in at least three directions relative to the carriage. As a result, the service apparatus provides increased access to locations within the cavity of the rotary machine and reduces the amount of time the rotary machine is out of service for maintenance.

An exemplary technical effect of the methods, systems, and apparatus described herein includes at least one of: (a) reducing the time to inspect and/or repair rotary machines; (b) increasing the accessibility of difficult-to-reach locations within a turbine assembly for inspection and/or in situ repair; (c) reducing the time that rotary machines are out of service for maintenance; (d) enabling complete in-situ inspection and repair of rotary machines; (e) increasing the precision and/or reliability of inspection and repair of rotary machines; (f) reducing unplanned service outages for a rotary machine; (g) enabling the extension of planned service outages of a rotary machine for inspection and/or repair; and (h) enhancing data capture for use in quantifying and/or modeling the service condition of at least some components of the rotary machine.

Exemplary embodiments of methods, systems, and apparatus for use in maintaining rotary machines are not limited to the specific embodiments described herein, but rather, components of systems and/or steps of the methods may be utilized independently and separately from other components and/or steps described herein. For example, the methods, systems, and apparatus may also be used in combination with other systems requiring inspection and/or repair of components, and are not limited to practice with only the systems and methods as described herein. Rather, the exemplary embodiment can be implemented and utilized in connection with many other applications, equipment, and systems that may benefit from using a service apparatus for inspection and/or repair.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A service apparatus for use in maintaining a turbine assembly, said service apparatus comprising:
    a carriage configured to move through a cavity of the turbine assembly;
    a maintenance device coupled to said carriage; and
    a motor system coupled to said maintenance device, wherein said motor system is configured to move said maintenance device relative to said carriage, said motor system comprising:
        a first motor configured to move said maintenance device in a first direction; and
        a second motor configured to move said maintenance device in a second direction;
    wherein said maintenance device comprises an extruder coupled to said motor system, said motor system configured to rotate said extruder.

2. The service apparatus in accordance with claim 1, wherein said first motor is configured to pivot said maintenance device about a longitudinal axis of said carriage.

3. The service apparatus in accordance with claim 2, wherein said second motor is configured to move said maintenance device along the longitudinal axis.

4. The service apparatus in accordance with claim 3, further comprising a third motor configured to move said maintenance device in a third direction, wherein said third motor is configured to move said maintenance device perpendicular to the longitudinal axis.

5. The service apparatus in accordance with claim 1, wherein said extruder comprises an applicator configured to apply a material to a surface of the turbine assembly.

6. The service apparatus in accordance with claim 1, wherein said maintenance device further comprises at least one of the following: an optical sensor, an auditory sensor, a mechanical sensor, a thermal sensor, and a magnetic sensor.

7. The service apparatus in accordance with claim 1, wherein said motor system comprises a rotary actuator.

8. The service apparatus in accordance with claim 1, wherein said motor system comprises a linear actuator.

9. The service apparatus in accordance with claim 1, further comprising an anchoring mechanism configured to maintain said service apparatus in position relative to the turbine assembly.

10. A system for maintaining a turbine assembly, said system comprising:
    a service apparatus comprising:
    a carriage configured to move through a cavity of the turbine assembly;
    a maintenance device coupled to said carriage;
    a motor system coupled to said maintenance device, wherein said motor system is configured to move said maintenance device relative to said carriage, said motor system comprising:
    a first motor configured to move said maintenance device in a first direction; and a second motor configured to move said maintenance device in a second direction; and a controller for said service apparatus;

wherein said maintenance device comprises an extruder coupled to said motor system, said motor system configured to rotate said extruder.

11. The system in accordance with claim 10, wherein said first motor is configured to pivot said maintenance device about a longitudinal axis of said carriage, and said second motor is configured to move said maintenance device along said longitudinal axis.

12. The system in accordance with claim 10, wherein said maintenance device further comprises at least one of the following: an optical sensor, an auditory sensor, a mechanical sensor, a thermal sensor, a magnetic sensor, infrared sensor, an acoustic sensor, an eddy current sensor, and an electromagnetic sensor.

\* \* \* \* \*